Feb. 8, 1966   S. J. SALAYKA   3,233,359
SOUND PRODUCING AERIAL TOP
Filed July 12, 1963   2 Sheets-Sheet 1
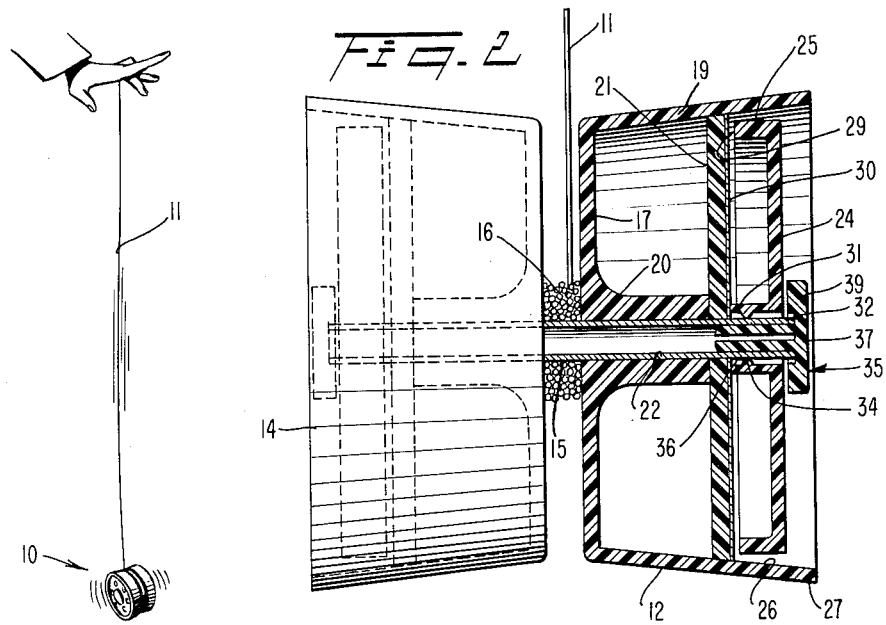
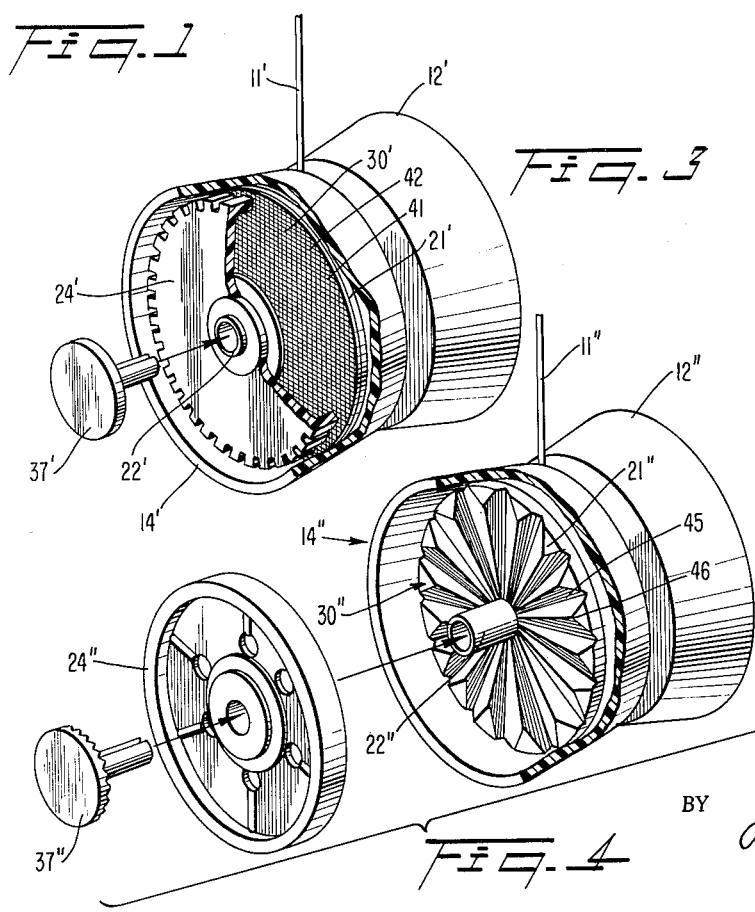
INVENTOR.
STEPHEN J. SALAYKA
BY
Alfred W. Vibber
ATTORNEY Feb. 8, 1966     S. J. SALAYKA     3,233,359
SOUND PRODUCING AERIAL TOP
Filed July 12, 1963     2 Sheets-Sheet 2
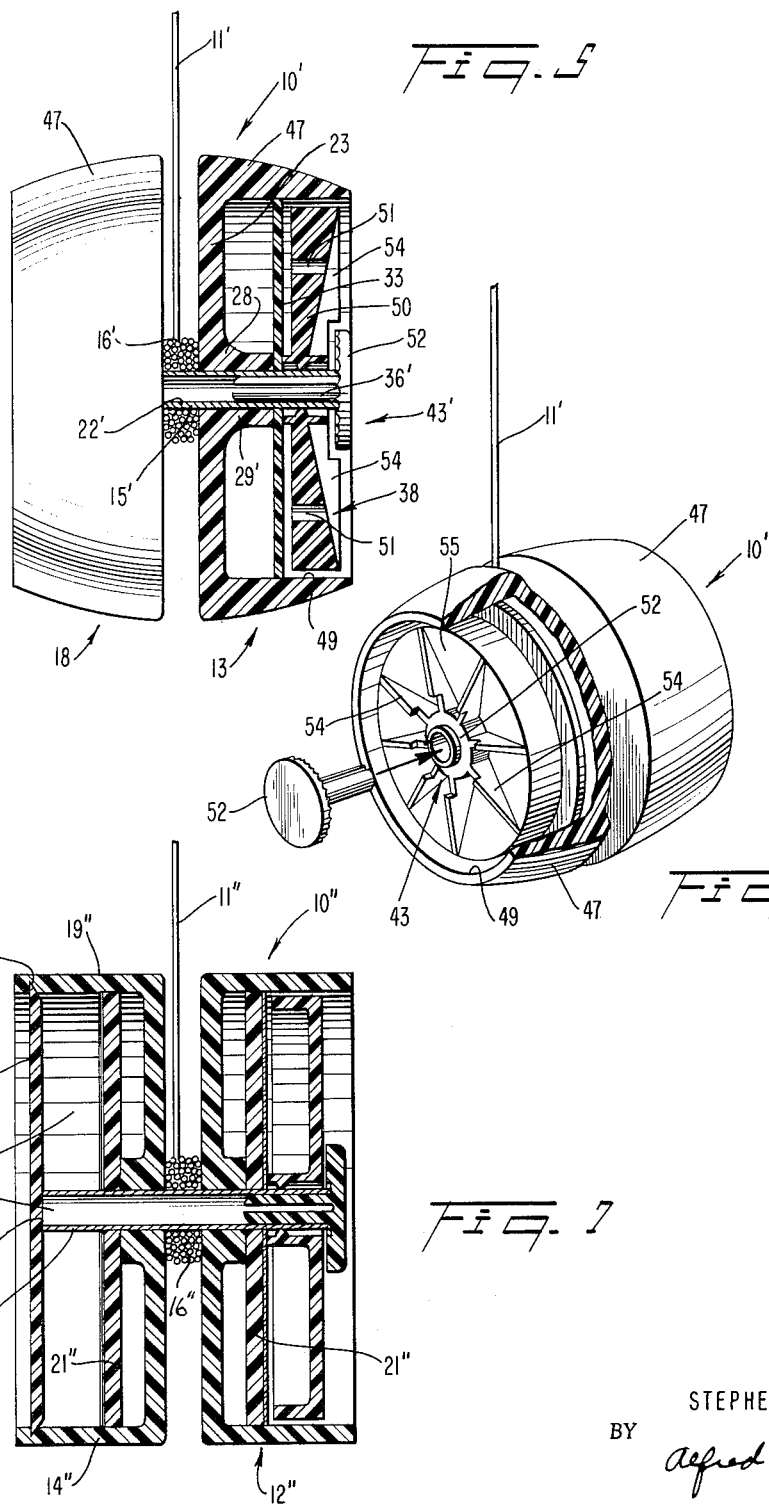
INVENTOR.
STEPHEN J. SALAYKA
BY
*Alfred W. Vibber*
ATTORNEY

United States Patent Office 3,233,359
Patented Feb. 8, 1966

3,233,359
SOUND PRODUCING AERIAL TOP
Stephen J. Salayka, 103 Berry St., Brooklyn, N.Y.
Filed July 12, 1963, Ser. No. 294,593
19 Claims. (Cl. 46—61)

This invention relates to a cord operated aerial top, and more particularly to that type of aerial top known familiarly as a yo-yo. The aerial top of the present invention, which will be referred to hereinafter as a yo-yo, is particularly characterized by the incorporation therein of novel sound and/or visual effect producing means whereby the normal function of entertainment by the top is enhanced.

The invention has among its objects the provision of a novel yo-yo incorporating a sound producing mechanism.

A further object of the present invention lies in the provision of a yo-yo of the type indicated wherein the sound produced by the yo-yo may be varied markedly by the substitution of different parts having different sound producing effects for one or more parts of the sound producing mechanism of the yo-yo.

Yet another object of the present invention is the provision of a yo-yo having sound producing mechanism which combines with its sound producing means for the production of varied visual effects.

Still further objects of the invention lie in the provision of a novel sound and/or visual effect producing yo-yo which is simple and rugged in construction, economical to make, and in which the sound and/or visual effect-producing mechanism does not substantially deleteriously affect the balance and mode of operation of the yo-yo.

The above and further objects and novel features of the invention will more fully appear from the following description when the same is read in connection with the accompanying drawings. It is to be understood, however, that the drawings are for the purpose of illustration only, and are not intended as a definition of the limits of the invention.

In the drawings, wherein like reference characters refer to like parts throughout the several views:

FIG. 1 is a view in perspective of a first embodiment of yo-yo, the yo-yo being shown during its operation;

FIG. 2 is a view on an enlarged scale, partially in axial cross section and partially in side elevation, of the yo-yo of FIG. 1, certain of the parts in the sectioned portion of the figure being shown in side elevation;

FIG. 3 is a fragmentary perspective view of a first modified embodiment of yo-yo in accordance with the invention;

FIG. 4 is a view similar to FIG. 3 of a second modified embodiment of yo-yo in accordance with the invention;

FIG. 5 is a view partially in axial cross section and partially in side elevation of a fourth embodiment of yo-yo in accordance with the invention;

FIG. 6 is a fragmentary view in perspective showing a fifth embodiment of yo-yo in accordance with the invention; and FIG. 7 is a view in axial cross section showing a sixth embodiment of yo-yo in accordance with the invention, such embodiment incorporating a sound amplified resonating chamber.

The first illustrative embodiment of yo-yo in accordance with the invention, shown in FIGS. 1 and 2, is designated generally by the reference character 10. Yo-yo 10 is connected to an operating cord 11 upon which it is alternately wound in opposite directions. Yo-yo 10 is at least generally longitudinally symmetrical, having similar oppositely disposed end portions 12 and 14 connected in spaced relationship by an axle-forming portion having a centrally exposed portion 15 between bodies 12 and 14. The lower or inner end of cord 11 has a loop therein which loosely engages the zone 15 of the axle, such loop being tightened upon the axle by movement of the arm of the operator whereby the rotating yo-yo frictionally engages the loop sufficiently in order to forcibly cause the cord to be wound up upon the axle in a plurality of superimposed coils designated 16.

The end portions 12 and 14 of the yo-yo 10 are similar; therefore a detailed description of body 12 will suffice. Body 12 may conveniently be formed by molding a plastic or resinous material which becomes substantially rigid when cured. One such suitable plastic material is phenol formaldehyde. Body 12 has a transverse inner end wall 17 in the form of a circular disc and an outwardly flared frusto-conical peripheral portion 19 integrally joined thereto. Also integrally connected to the end wall 17 is a central axially extending hub portion 20. Body 12 per se is completed by a disc-like end closure member 21 which may be secured as by the use of an adhesive to the end of hub 20 and to the inner wall of the peripheral portion 19 of the body 12.

In the embodiment shown, the end portions 12 and 14 of the yo-yo are connected in spaced relationship by the axle 22 which also may be made of plastic or resinous material and which may be adhesively secured to the bodies 12 and 14. The axle 22 extends, as shown, through aligned passages in hub 20 and end closure plate 21, projecting axially outwardly to lie somewhat inwardly of the outer edge of the hood 27 on portion 19. Journalled upon the thus projecting outer end of axle 22 is a disc 24 which lies within the outer hood-forming portion 27 of the body 12. Disc 24 has a diameter such that its peripheral surface 25 lies spaced at all times from the inner surface 26 of the hood 27. In the embodiment shown, the disc 24 has a thin web or flange portion and a thicker rim portion so as to concentrate its weight at the rim, and a central, journal-forming portion which is of such axial length that its inner end 31 contacts the outer face 30 of plate 21 but that the inner peripheral edge 29 of the rim of the disc remains spaced from the inner surface 30 of member 21 at all times. Bore 32 through the center of disc 24 somewhat exceeds in diameter the outer diameter of axle 22. Bore 32 is provided at one zone thereof with an annular inwardly projecting flange 34 the inner surface of which somewhat exceeds the diameter of axle 22.

By reason of such dimensioning of the parts, the disc 24 is free for substantial axial movement along axle 22, radial play or shucking with respect to the axle, and appreciable canting or tipping with respect to the axis of the axle. Disc 24 is retained upon the outer end of the axle 22 by means of a disc-retaining member 35 which also may be made of plastic or resinous material. Member 35 has a longitudinally split resilient stem portion 36 which is inserted into the outer end of axle 22 and is securely retained therein until it is deliberately removed. Retainer 35 has an enlarged outer member or head 37, the radial outer or end portion 39 of which overlies disc 24 outwardly of bore 32.

As above indicated, the yo-yo is operated in a conventional manner. The cord 11 is initially wound about portion 15 of axle 22 to form superimposed coils 16 of cord 11. Thereafter the yo-yo is thrown or tossed so that the coils 16 unwind and the yo-yo rotates in a first direction. Because of its appreciable mass and thus inertia, the disc 24 lags behind the body of the yo-yo in its rotation. The loose journal mounting of the disc upon the axle 22, plus, the freedom of the disc 24 to tilt or cant upon the axle, produce rapidly repeated seizings and loosenings of the disc upon the axle. These phenomena are repeated so rapidly that they give rise to rather loud sound of varying frequencies, such frequencies changing with the change in the difference of surface speed between the axle 22 and the portion of the bore 32 on the annular rib thereon in contact with the axle.

The character of the thus produced sound may be changed somewhat by substituting other discs for disc 24, such other discs having different vibrational and frictional characteristics. It is believed that disc 24 functions somewhat similarly to a plate or cymbal which is rapidly struck at its center. The disc 24 is believed to break up into a variety of wave patterns, the disc acting somewhat as a vibratory diaphragm in amplifying and propagating the thus produced sound.

The varying sound produced by the described yo-yo is believed to be caused in part by the variable accelerations to which the yo-yo body and the disc 24 are subjected as the yo-yo both travels up and down the cord 11 and as it rotates on its axis at different speeds in opposite directions. Added to these effects are the different effects of the air upon the yo-yo, particularly upon the disc 24 thereof, during the operation of the yo-yo. Not only does the yo-yo travel through the air in its operation, thereby subjecting different portions of disc 24 to varying air pressures, depending upon direction of rotation of the yo-yo and of its direction with respect to cord 11, but the air present between plate 21 and disc 24 is believed to play a part in the operation of the device. Thus, such latter air tends to be thrown outwardly by the rotation of end plate 21 and the disc 24 and to escape axially between surfaces 25 and 26. All of such factors affect the operation of the yo-yo. Perhaps at times some of the factors are more important than some of the others. In any event, during operation of the device in said up and down or to and fro movement thereof, the disc produces the described loud, high frequency sound. Although applicant has given above his best present understanding of the mode of operation of the yo-yo of the invention insofar as the sound-producing effect thereof is concerned, he does not wish to be bound by such theory; the invention is, therefore, defined by the claims appended hereto.

As above set forth, it is believed that the interaction between the air and the end surfaces of the body of the yo-yo and the disc plays a part in the production of sound by the yo-yo of the invention. Different sound effects appear to be produced with at least one of the confronting surfaces of the body and the disc having a configuration other than plane. This appears to disturb the outward passage of air between the body and the disc under the influence of centrifugal force, such air disturbances apparently causing the disc to be canted and vibrated somewhat sooner and more rapidly than if both of the confronting surfaces were smooth. A first modified construction of yo-yo in accordance with the invention, with such modified construction, is shown in FIGURE 3. The yo-yo there shown is generally similar to that of FIGS. 1 and 2; consequently the parts of the modified embodiment are designated by the same reference characters as in FIGS. 1 and 2, but with an added prime. As shown in FIG. 3, the outer face 30' of end member 21' of the body of the yo-yo is serrated or roughened in a regular manner, the serrations being produced by intersecting score lines. Consequently, surface 30' has a plurality of uniformly spaced peaks 41 distributed thereover, such peaks all lying in a plane spaced outwardly somewhat from the plane containing valleys 42 between the peaks. In the operation of the yo-yo of FIG. 3, the air between the end member 21' and the disc 24' appears to be forced into a series of small eddies as it flows generally radially outwardly between the disc and the end member, thereby immediately disturbing the loosely journalled disc and causing it to cant upon the axle.

In FIG. 4 there is shown a second modified construction of yo-yo wherein the outer surface of the body is of a different configuration. In FIG. 4, which shows a yo-yo having a construction generally the same as that of FIGS. 1 and 2, the elements of the yo-yo which are similar to those of the first described embodiments are designated by the same reference characters by an added double prime. In FIG. 4 the outer face 30" of end member 21" is provided with a plurality of equally angularly spaced radially directed flutes having peaks 45 with valleys 46 therebetween. The thus formed surface 44 also appears to cooperate with the confronting inner face of the disc 24" to modify the flow of air between the end surface of the body and the inner face of the disc, thus to disturb such airflow and to set the disc into vibration angularly with respect to the axle. Such effect is more pronounced when the inner surface of disc 24" is similarly fluted, with the number of flutes on the disc different from that on the surface of the end member 21". It can be seen that, with such latter construction, upon relative rotation between the disc and end member the air therebetween is subjected to periodic compressions at rapidly shifting angularly disposed locations about the axis of the body, thereby giving rise not only to vibratory canting of the disc but to what is believed to be audible vibrations in the air between the body and the disc.

The still further described embodiment of yo-yo shown in FIG. 5 differs from the previously described embodiments both as to its external configuration and as to the construction and manner of operation of the disc and its interaction with the disc retaining means. In the embodiment of FIG. 5 the two body halves 13 and 18 of the yo-yo 10' have the peripheries 47 thereof rounded to lie upon the surfaces of a part of a spheroid. Each of body portions 13 and 18 is provided with an outwardly facing cavity 49 which is circular cylindrical as opposed to the somewhat outwardly flared cavity within the hood 27 of the first described embodiments. The yo-yo of FIG. 5 is provided, as before, with an inner end wall, here designated 23, an outwardly projecting central boss 29' integral thereof, and a transverse end surface forming member 33 secured to the body. The two body parts are secured together as before by the axle 22', which provides the central cord portion 15' upon which the cord 11' is wound. The rotatable disc 38 is in this construction of generally dished configuration, the section of the disc radially outwardly from the center thereof being of increasingly greater axial dimension as indicated at 50. The disc 38 is provided, as before, with a hub portion having a bore therethrough substantially exceeding in diameter that of axle 22', the hub having a single axially thin annular bearing portion loosely receiving the axle. The web 50 of the disc 38 is provided with a plurality of holes 51 which are spaced radially from the axis of the disc. Such holes, which allow air to pass therethrough in both the inward and outward direction, appear to have a somewhat siren-like effect and to add an air-produced sound to the sound produced by interaction of the hub of the disc on the axle upon which it is mounted. The flow of air about the rotating disc 38 may be further disturbed as desired by providing a plurality of vanes 54 on one or both of the surfaces of the disc.

The disc retaining member, in this instance designated 43, is generally similar to member 37 of the previous embodiments. In this case, however, the inner edge of the hub of the member is serrated or scalloped as shown at 52 so that when the disc travels outwardly along the axis the roots of vanes 54 engage the peaks and the scallops 52 thereby both producing a mechanical vibration and thrusting the disc momentarily acting inwardly along the axle.

The disc or discs employed with the yo-yo of the invention may also be colored, mirrored or decorated to produce pleasing visual effects as the yo-yo is operated. In FIG. 6 there is shown in end elevation a yo-yo similar to that of FIG. 5 but with the sectors 55 between the vanes 54 with different colors, as indicated, whereby in effect to produce a color wheel where the disc rotates. Sectors 55 may also be in the form of mirrors to reflect light as the disc rotates, or may be decorated with various figures which appear to merge in different manners as the speed of rotation of the disc varies.

In FIG. 7 there is shown a still further embodiment of yo-yo 10″ in accordance with the invention. This construction incorporates a rotatable disc in half body 12″ of the yo-yo, the disc and its manner of cooperation with the yo-yo body being generally similar to those of FIG. 2. Accordingly, the elements of yo-yo part 12″ of the yo-yo 10″ of FIG. 7 are designated by the same reference characters as in FIG. 2, but with added double prime.

The axle 56 which joins yo-yo parts 12″ and 14″ is in this instance made as a thin walled metal tube which extends from body part 12″ through the spool forming zone between parts 12″ and 14″ into a resonating air chamber 57 formed within body part 14″ by an annular wall 19″, the end wall member 21″, and the diaphragm member 59 which is spaced axially outwardly from member 21″. The diaphragm 59 is mounted in body 14″ by having its inner edge secured within an annular groove 60 in the wall 19″. In the embodiment shown, the axle 56 extends axially outwardly so that its left hand outer end 61 contacts the central zone 62 of diaphragm 59 when the diaphragm is in its neutral, at rest, position. It will be seen that vibrations in the yo-yo body caused by rotation of the disc 24″ with respect thereto are not only in part radiated directly as sound in the manner previously described, but are transmitted in part through the axle 56 to the resonating chamber 57. The diaphragm 59, contacting the end of the axle 56, functions efficiently to amplify and project such vibrations as sound. In some instances, however, it is sufficient for the axle 56 to project within the chamber 57, without contacting the diaphragm, since actual contact between the axle and the diaphragm 59 is unnecessary.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention will now be apparent to those skilled in the art.

What is claimed is:

1. An aerial top having a generally longitudinally symmetrical body with a central, cord-receiving portion and two wheel-like end portions joined by the central portion coaxially thereof, a flexible cord member having a loop at one end thereof disposed about and engaging the central portion of the top, the top being adapted to be wound up upon and unwound from the cord in alternately opposite directions, and a noise-producing mechanism associated with the top, said mechanism comprising a central axle projecting outwardly of the body of the top at one end thereof, a disc of appreciable mass loosely centrally journalled on the axle, and means retaining the disc on the axle with substantial freedom of endwise and canting movement with respect to the axle.

2. An aerial top as claimed in claim 1, wherein the disc is made of substantially rigid material whereby it radiates sound when vibrated by its rotation on the axle.

3. An aerial top as claimed in claim 1, wherein the axially inner face of the disc closely confronts the respective outer end surface of the body of the top.

4. An aerial top as claimed in claim 3, wherein the confronting faces of the disc and body of the top are spaced a short distance from each other at all times.

5. An aerial top as claimed in claim 3, wherein at least one of said outer end surface of the body of the top and the confronting surface of the disc is formed to contain a plurality of peaks and valleys forming air conducting channels between the body of the top and the inner face of the disc.

6. An aerial top as claimed in claim 5, wherein the end surface of the body contains said peaks and valleys.

7. An aerial top as claimed in claim 5, wherein the peaks and valleys are in the form of cross serrations.

8. An aerial top as claimed in claim 5, wherein the peaks and valleys are in the form of radially disposed flutes.

9. An aerial top as claimed in claim 1, comprising an axially outwardly extending annular hood on the body closely surrounding the periphery of the disc.

10. An aerial top as claimed in claim 1, wherein the axle is circular cylindrical, and the disc has a central passage somewhat larger than the diameter of the axle through which the axle is received, the axle-engaging surface of the passage in the disc being axially narrow whereby the disc may cant on the axle.

11. An aerial top as claimed in claim 1, wherein the axle is in the form of a thin-walled tube, and the disc retaining means has a central stem received within the end of the axle and a head outwardly overlying the center of the disc.

12. An aerial top as claimed in claim 1, wherein the disc has a plurality of air conducting holes therethrough disposed outwardly of its center.

13. An aerial top as claimed in claim 1, wherein the disc has a plurality of generally radially disposed ribs on at least one of its surfaces, said ribs functioning as air impelling vanes.

14. An aerial top as claimed in claim 13, wherein the ribs are disposed on the outer face of the disc.

15. An aerial top as claimed in claim 13, wherein the ribs are disposed on the inner face of the disc, the peaks of the ribs closely confronting but being spaced from the respective end face of the body of the top.

16. An aerial top as claimed in claim 1, wherein the outer face of the disc has a plurality of zones having different light reflecting characteristics.

17. An aerial top as claimed in claim 1, comprising a resonating chamber on the top, and means to transmit vibrations set up by the rotation of the disc with respect to the body of the top to the resonating chamber.

18. An aerial top as claimed in claim 17, wherein the resonating chamber is located on the second end of the body of the top oppoiste that at which the disc is located, the chamber is formed in part by a diaphragm disposed transversely to the axis of the body and affixed to the body at the second end thereof, and the means transmitting vibrations from the disc to the resonating chamber comprises said axle, the axle extending from its disc-supporting end through the body of the top into the resonating chamber.

19. An aerial top as claimed in claim 18, wherein the end of the axle within the resonating chamber contacts the diahphragm in the central portion thereof in at least the neutral, at rest, position of the diaphragm.

References Cited by the Examiner
UNITED STATES PATENTS 2,676,432   4/1954   Field _____ 46—61
2,940,212   6/1960   Bond _____ 46—61

DELBERT B. LOWE, *Primary Examiner.*